G. R. BABBITT & W. A. HARRIS.
Piston Packing.
No. 136,405.        Patented March 4, 1873.
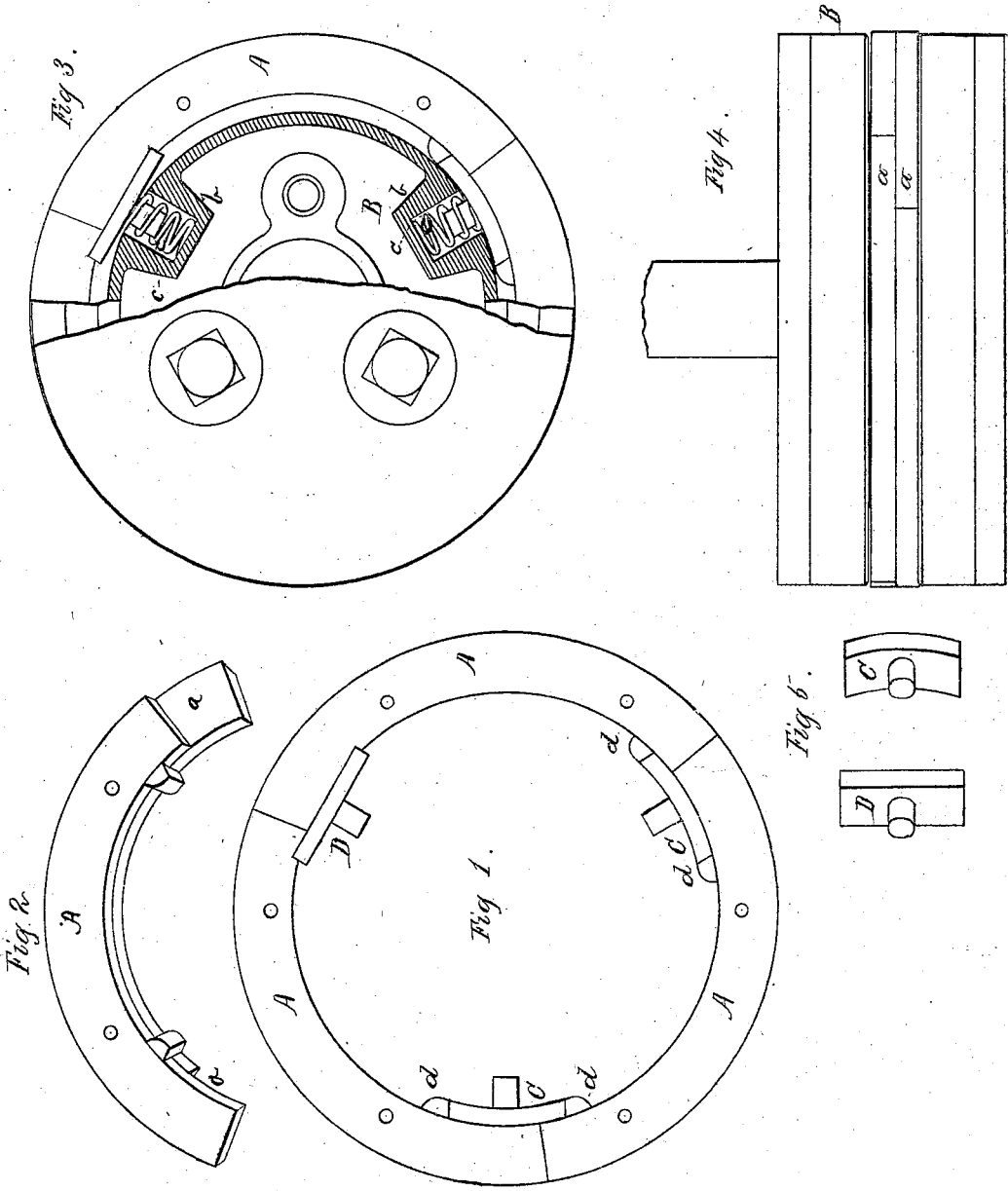

UNITED STATES PATENT OFFICE.

GEORGE R. BABBITT AND WILLIAM A. HARRIS, OF PROVIDENCE, R. I.

IMPROVEMENT IN PISTON-PACKINGS.

Specification forming part of Letters Patent No. 136,405, dated March 4, 1873.

*To all whom it may concern:*

Be it known that we, GEORGE R. BABBITT and WILLIAM A. HARRIS, of the city and county of Providence, in the State of Rhode Island, have invented a new and useful Improvement in Piston-Packings; and we do hereby declare that the following specification, taken in connection with the drawing making a part of the same, is a full, clear, and exact description thereof.

Our improvement consists in certain features of construction whereby the packing-ring of a steam-engine piston can be more accurately fitted in its parts, and more economically made.

In the drawing, A A A, Figure 1, represent the several sections which compose a complete packing-ring. At Fig. 2, one of the sections is shown separately in perspective view.

Instead of scarf-jointing the several sections of rings, as has heretofore been customary, we connect them together by means of a lap-joint, as seen at *a*, Fig. 2. When the several sections are made up into a ring and set in the groove in the chunk-ring B of the piston, an edge view of the joint will appear, as at *a a*, Fig. 4. In the chunk-ring B the usual pockets *b* are made, to hold springs *c*, for setting out the packing-ring. For the purpose of protecting the joints *a a*, so that steam cannot pass edgewise through the ring, and also to provide the proper means for enabling the springs to act to press the several sections against the surface of the cylinder of the engine, plates C D are used, which are pieces of metal of the width of the ring, and long enough to cover the joints, whose faces may be concentric with the inner face of the ring, as seen at C, in which case lugs *d*, to serve as guides, should be cast on the under side of the ring. The plate may also be made with its surface a flat plane, as seen at D, in which case no lugs or guides *d* are necessary; but, in place thereof, the under side of the ring is cut away so as to form a seat to receive the plate. Each of the said plates C D is furnished with a shank upon its back side, which enters the pocket *b* and the coiled spring *c* therein, as seen at Fig. 3.

We prefer to make the sections of the packing-ring of two plates, 1 and 2, Fig. 2, and rivet the two together, for the reason that thus the lap-joint can be made with the ordinary machine-tools, and with great accuracy and economy; but each section may be made, if preferred, from a single casting, and the portion to be lapped be cut by a milling-tool.

It will readily be seen that with lap-joints accurately faced it is impossible for the steam to blow through the joint from one side of the piston to the other, and if the ring is made up of two half rings riveted together, each of which parts has been faced in a lathe, it is easy to make such joint. Furthermore, as this kind of joint enables us to dispense with a break-joint plate, such as is shown in the Letters Patent granted to A. W. Harris, April 2, 1872, and which is necessary to prevent the steam blowing through if the ring is scarf-jointed, we are enabled to have a surface to the break-joint setting-out plates C D, which, without the necessity of hand dressing, can be faced with perfect accuracy in a lathe, if the surface be curved, or by a planer, if it be flat.

We are well aware that sectional rings have heretofore been provided with complex joints, in which some of the overlapping coincident surfaces corresponded with lines radiating from the center of the piston, and also with other coincident overlapping surfaces, which were on lines concentric with the circumferential line of the piston. We are also aware that packing-rings have been jointed heretofore by overlapping surfaces which were in the place of lines radiating from the center of the piston, as herein shown; such packing-rings, however, differed from ours, in having the abutting ends fitted with peculiar joints, and they were so combined with wedge-shaped adjusters that the joints between the said abutting ends were not "broken," but were, in fact, truly coincident with the joints between the said adjusters and the packing-rings. Our improved packing has joints of great simplicity, which require no special tools, and involve but little labor or expense in their construction, and when combined, as described, with the "break-joint" plates, they prove to be of great practical value.

Having thus described our invention, we claim as new and desire to secure by Letters Patent—

The metallic sectional rings A, overlapping at the ends of the sections in the plane of lines radiating from the center of the piston, and with abutting ends at right angles to the overlapping surfaces, and also in the plane of radial lines, in combination with the setting-out plates C D, and so arranged as to break joints with the abutting ends and coincident overlapping surfaces of the sections, in the manner described.

GEO R. BABBITT.
WM. A. HARRIS.

Witnesses:
 EDWIN C. PIERCE,
 THOMAS F. COSGROVE.